No. 855,720. PATENTED JUNE 4, 1907.
E. W. MOODY.
DITCHING PLOW.
APPLICATION FILED SEPT. 13, 1906.

4 SHEETS—SHEET 1.

Witnesses
G. R. Thomas
H. C. McCartney

Inventor
E. W. Moody
By Chandler & Chandler
Attorneys

No. 855,720. PATENTED JUNE 4, 1907.
E. W. MOODY.
DITCHING PLOW.
APPLICATION FILED SEPT. 13, 1906.

4 SHEETS—SHEET 2.

Witnesses
C. R. Thomas
H. P. McQueeney

Inventor
E. W. Moody

By Chandler & Chandler
Attorneys

No. 855,720. PATENTED JUNE 4, 1907.
E. W. MOODY.
DITCHING PLOW.
APPLICATION FILED SEPT. 13, 1906.
4 SHEETS—SHEET 3.
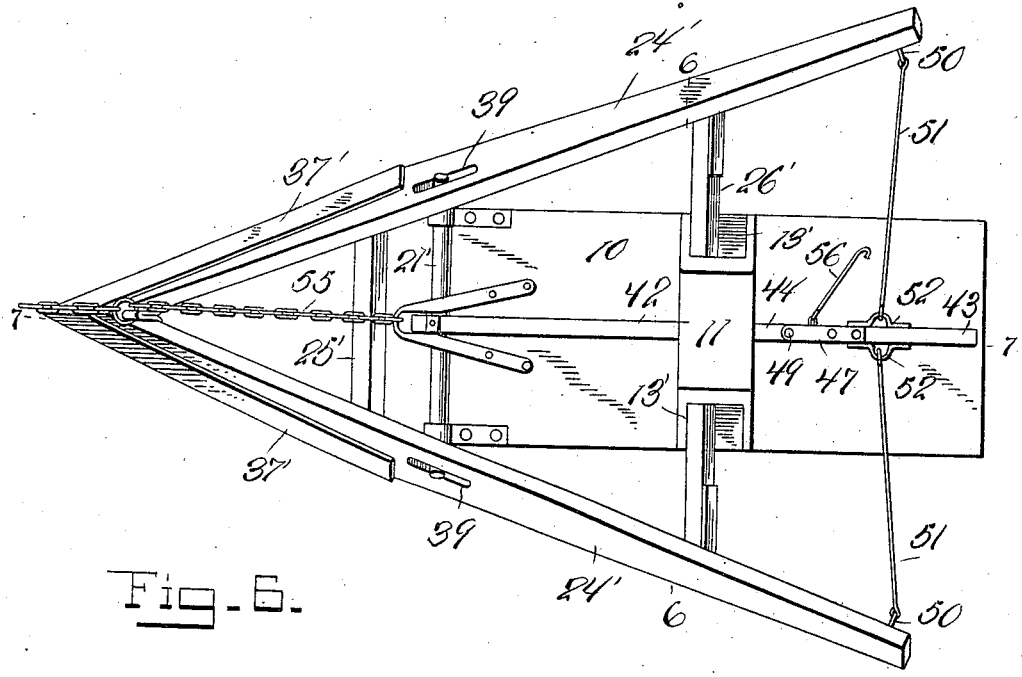
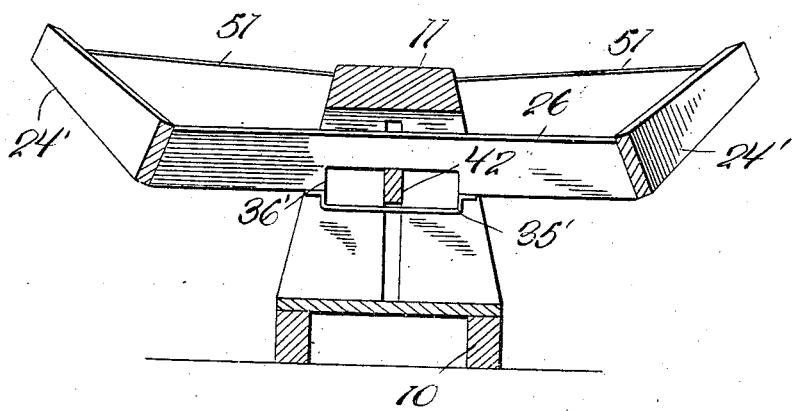
Witnesses
G. R. Thomas
Inventor
E. W. Moody
By Chandler & Chandler
Attorneys No. 855,720. PATENTED JUNE 4, 1907.
E. W. MOODY.
DITCHING PLOW.
APPLICATION FILED SEPT. 13, 1906.

4 SHEETS—SHEET 4.

Witnesses
G. R. Thomas
N. L. McCartney

Inventor
E. W. Moody
By Chandler & Chandler
Attorneys

UNITED STATES PATENT OFFICE.

EDWARD W. MOODY, OF LEWISTOWN, MONTANA.

DITCHING-PLOW.

No. 855,720.                    Specification of Letters Patent.                    Patented June 4, 1907.

Application filed September 13, 1906. Serial No. 334,473.

*To all whom it may concern:*

Be it known that I, EDWARD W. MOODY, a citizen of the United States, residing at Lewistown, in the county of Fergus, State of Montana, have invented certain new and useful Improvements in Ditching-Plows; and I do hereby declare the following to be a full, clear, and exact description of the invention, such as will enable others skilled in the art to which it appertains to make and use the same.

This invention has reference to ditching plows, its object comprising, generally, the provision of a device of that class adapted to form a ditch either upon level ground or upon a hill side.

The particular improvements consist in the formation of a ditching plow in which the wings, of the plow frame, are capable both of a vertical adjustment, to regulate the depth of the furrow cut, and a lateral movement bodily to enable the plow to operate upon rising ground, or hillside, to either the right or the left of the plowman.

Further improvements include the provision upon the plow sled of a vertically slotted standard within which the adjusting lever for the wings works; and the construction of such lever in two sections one of which has a horizontal swinging movement independent of the other.

Still further improvements will be disclosed in the following detailed description.

Figure 1:
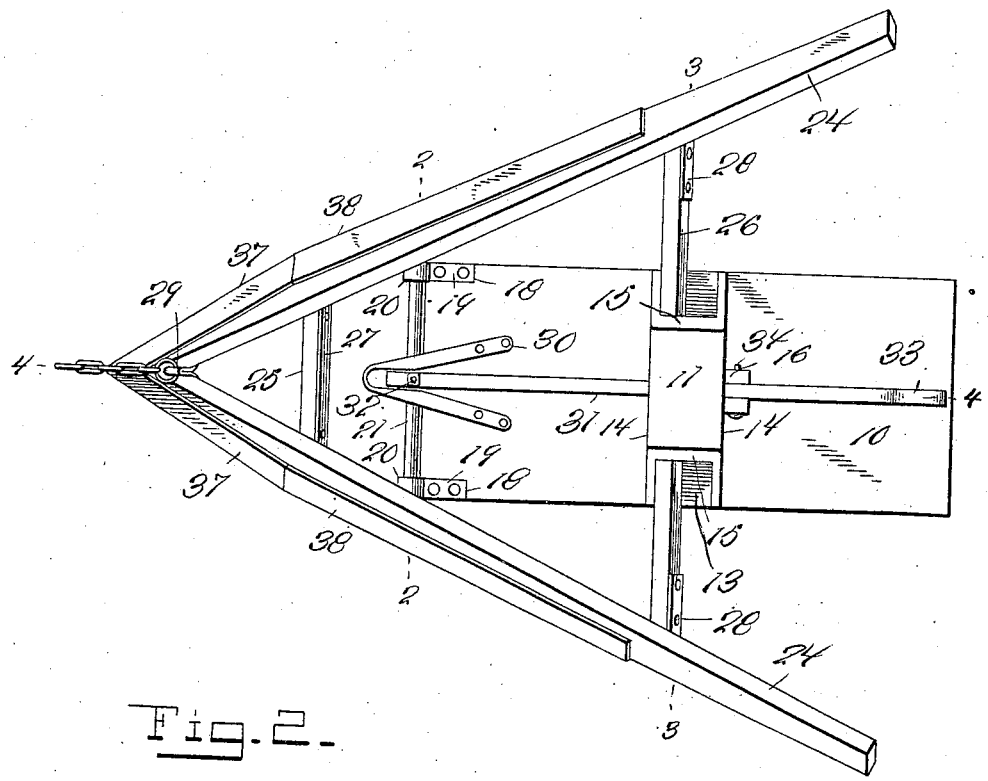
Figure 2:
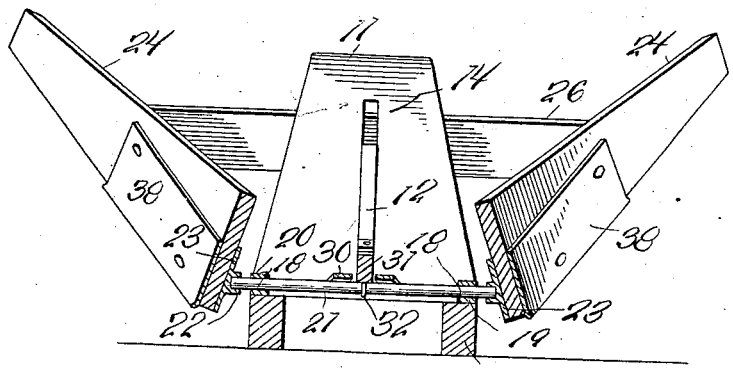
Figure 3:
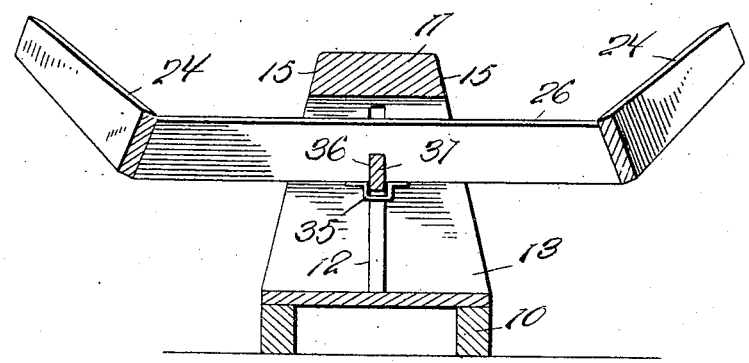
Figure 4:
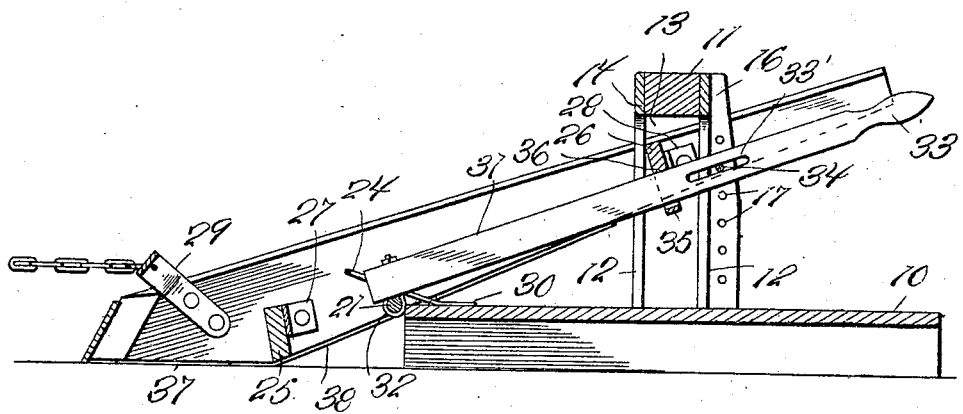
Figure 7:
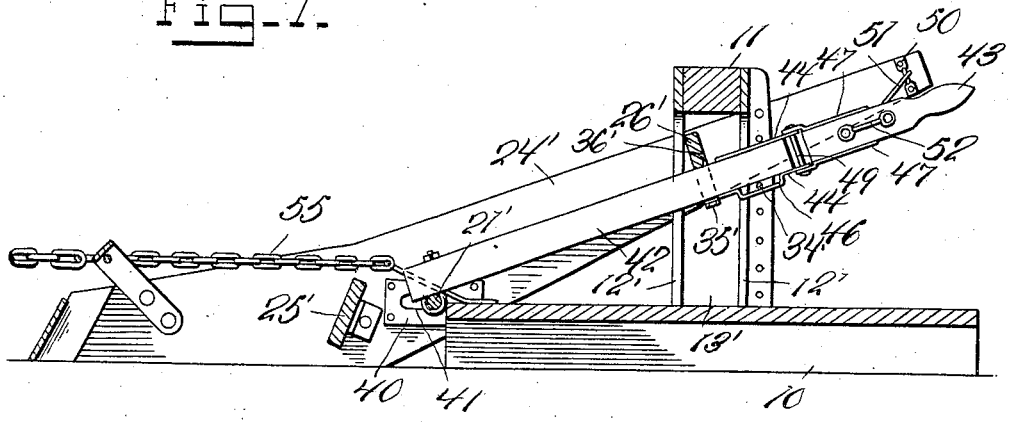
Figure 8:
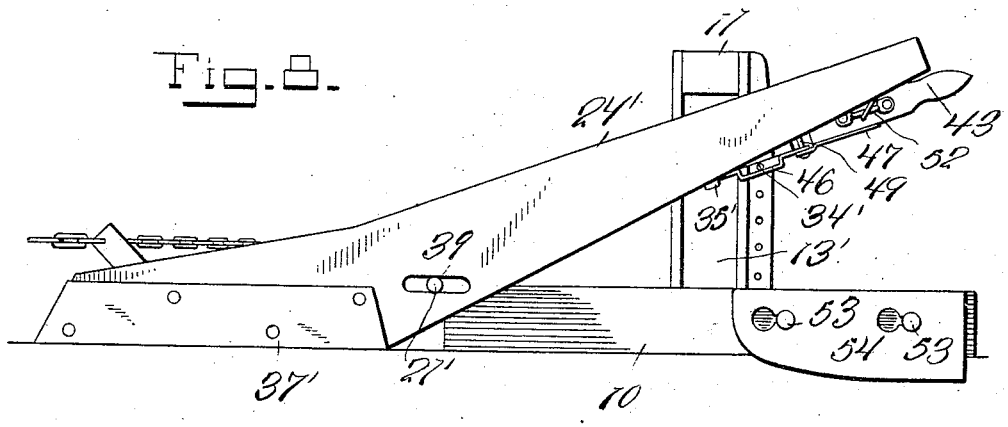
Figure 9:
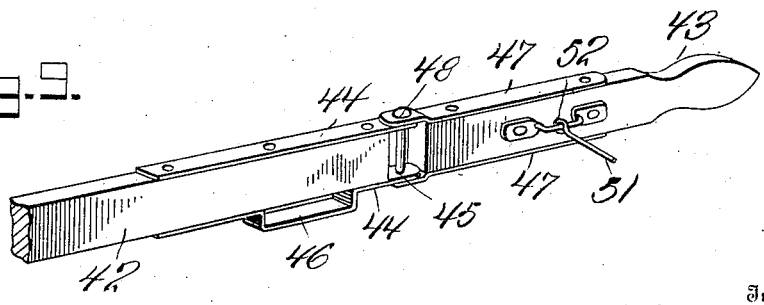

The preferred embodiment of the invention is illustrated in the accompanying drawings in which like parts are designated by corresponding reference numerals in the several views, and in which, Figure 1 is a top plan of the plow showing the wings adapted for use on level ground. Figs. 2 and 3 are transverse vertical sections taken on the lines 2—2 and 3—3 respectively of Fig. 1. Fig. 4 is a longitudinal vertical section taken on the line 4—4 of Fig. 1. Fig. 5 is a top plan view of a modified form of the invention. Fig. 6 is a transverse vertical section taken on the line 6—6 of Fig. 5. Fig. 7 is a longitudinal vertical taken on the line 7—7 of Fig. 5. Fig. 8 is a side elevation of Fig. 5. Fig. 9 is a perspective view of the two part adjusting lever.

Referring to the drawings, and especially to Figs. 1 to 4, 10 designates generally the plow sled upon the upper face of which is mounted the vertical standard 11 formed with the vertical guide slots or openings 12 and 13 formed respectively in the front and rear faces 14 and sides 15 of the standard, and communicating with each other as shown in Fig. 3. The rear face of the standard is provided on each side of and close to its slot 12 with a vertical shoulder 16, said shoulders having a series of alining perforations 17 formed therein. The front end of the sled 10 is provided at opposite sides with seats 18 formed in its upper face for the reception of metal straps 19 having the upwardly bent portions 20 at their front ends, such bent portions forming bearings for the bar 21 upon which the plow frame swings, the ends of said bar fitting in sleeved sockets 22 formed in plates 23 secured to the inner face of the wings 24 of the plow frame, which latter is of V shape, the wings being connected by the horizontal braces 25 and 26 at the front and rear of the plow frame. Said braces are further strengthened by the angle-irons 27 and 28 respectively, while the plow frame carries at its apex a V shaped metal strap 29 bolted to the inner face of wings 24 and projecting slightly above the upper edge of the wings, the draft chain being attached to such projecting end. Sled 10 is further provided with a V shaped strap 30 secured to the upper face thereof between the straps 19, the front edge of strap 30 projecting beyond the front edge of the sled. The members of strap 30 are beveled or inclined slightly on their inner face to form a guide opening for the front end of the actuating lever 31 connected with the bar 21 by means of a curved bolt 32 carried on the under face of said lever at its front end, and embracing said bar, one arm of the bolt passing completely through the lever and provided with a nut, which latter serves as an additional means for retention of the bolt. The actuating lever extends through and works in the guide slot 12 in the standard 11, and the opening formed by the spaced shoulders 16, the rear end of the lever being provided with the handle portion 33. Said lever is further provided with a longitudinal slot 33' formed therein intermediate its ends, and adapted to register successively with the perforations 17 in shoulders 16, during movement of the lever in one direction or the other, the lever being retained in adjusted position by means of a pin or bolt 34 passed through slot 33' and through one of the pairs of perforations 17.

Lever 31 is connected with the plow frame by means of a metal strap 35 secured to the under face of the rear brace, 26, said strap passing beneath said lever and holding the same in contact with said brace, which latter is also provided with an opening 36 formed in its lower edge, the upper half of said lever fitting therein. The wings of the plow frame are approximately triangular in side elevation, the apex of the triangle pointing toward the ground, the outer face of the wings having the blades 37 and 38 secured thereto and projecting slightly below the lower edge of the wings.

From the foregoing it will be obvious that the entire plow frame may be swung upon its pivot bar 21 by means of the actuating lever 31, thus regulating the depth of the furrow or ditch cut, and that the lever will be retained, when adjusted, by means of the pin 34.

Figs. 5 to 9 show a form of plow frame adapted especially for ditching a hill side, the sled 10 upon which the frame swings, and the standard 11 mounted thereon being similar to those shown in Figs. 1 to 4, and above described. The wings 24' are provided, however, with only the front blades 37', the length of which is greater than that of blades 37, while the rear end of said wings is inclined slightly upward, as shown in Fig. 8. Each wing 24' has formed therein a horizontal slot 39 located directly above the rear end of blades 37', and slightly to the rear of the brace 25', there being a metal plate 40 secured to the inner face of each wing provided with a longitudinal opening 41 registering with the slot 39, the ends of the bar 21' carried by the sled 10 having a lateral play therein as afterward described. The actuating lever in the modified, or hill side construction, is composed of two sections 42 and 43. the former being connected to bar 21' in like manner with lever 31. The rear end of said section is provided with the straps 44 bolted to its upper and lower faces, and extending beyond said section, as shown, the extended ends having the alining bolt openings 45 formed therein. The lower strap 44 is bent downwardly intermediate its ends as at 46 to form a shoulder. A strap 35' is secured to the under face of the rear brace 26', which latter has a longitudinal opening 36' formed in its under face directly above the downwardly bent portion of said strap, the space between the upper edge of opening 36' and said strap being sufficient to enable the lever member 42 to extend therethrough: The rear section 43 of the lever is provided at its front end with straps 47 perforated as at 48, a bolt 49 being passed through the perforations or openings 47 and 45 of the straps 44 and 47 to connect the lever sections, the front section of the lever and the rear brace of the plow frame working in the corresponding guide openings 12' and 13' of the standard 11 in a manner similar to that in which the lever 31 and brace 26' operate. The wings 24' of the plow frame carry strips 50 secured to their inner face at the rear end thereof and connected by means of links 51 with similar strips 52 mounted on the lever section 43 toward the handle portion thereof, the eye-ends of said links being secured to the outwardly bent portions of said strips. The entire plow frame is adjustable vertically by means of the adjusting lever, in a manner similar to that already described in connection with the first mentioned construction, being retained in adjusted position by means of the pin 34' which passes through the perforated shoulders 16' and through the opening formed by the shoulder 46 in the strap 44. In addition to such vertical adjustment, the plow frame may also be swung bodily to the right or left, according to the situation of the hill, by means of the link connection between the lever section 43, with the wings 24' and the pivotal connection between said section and the section 42, movement of section 43 to one side or the other causing a corresponding movement of the plow frame, as will be readily understood.

In turning or drawing the plow to the place where the ditch is to be formed, the adjusting lever is lowered until its slot is in alinement with the lowermost pair of perforations in the standard shoulders, when the retaining pin is inserted in place, the nose of the plow being raised above the ground, when the frame is in such position, thus rendering the plow inoperative.

When the first described plow frame is in use, the dirt is thrown to both sides, as the ditch is formed, but when the hill side frame is in operation, and is swung to one side or the other, the upper side or cutting edge will be practically horizontal, the inclined lower frame serving to throw the dirt out of the ditch, downwardly.

The sled sides are provided with a series of bolts 53 having forwardly extending heads to fit the openings in the land side 54 which is attached to the sled when the hill side plow frame is used. A chain 55 which connects the draft chain with the V-shaped strap 30, may also be employed, in connection with the hill side plow frame, and, if desired, the movable section 43 of the actuating lever, may be provided at its inner end with a hook 56, adapted to engage the corresponding link 51, when the lever is shifted in one direction or the other to hold the lever in adjusted position.

Further explanation of the operation of the plow is thought unnecessary, in view of the foregoing extended description.

The device is susceptible of numerous slight modifications and changes within the scope of the claims, and the invention is therefore not limited to the exact details of construction shown and described.

What is claim is:—

1. A plow comprising a sled, a plow frame pivotally connected with the front end of said sled and including wings directly connected together at their front ends and extending on opposite sides of the sled; a brace connecting said wings; and an actuating lever pivotally mounted upon said sled and connected with said brace, for bodily raising and lowering said frame.

2. A plow comprising a sled; a plow frame pivotally connected with the front end of said sled and including wings extending on opposite sides thereof; means mounted upon said sled and provided with communicating guide slots disposed at right angles to each other; means connecting said wings and movable in one of said guide slots; and actuating means pivotally mounted upon said sled and attached to said connecting means, for raising and lowering said plow frame, said actuating means being movable in the other of said guide slots.

3. A plow comprising a sled; a standard mounted upon the sled and provided with vertical guide slots disposed longitudinally and transversely of the sled; a plow frame pivotally connected with the sled and including wings extending on opposite sides of the sled; a brace connecting the wings and working in the transverse guide slot in the standard; and an actuating lever working in the vertical guide slot and connected with the plow frame and brace for raising and lowering the same.

4. A plow comprising a sled; a standard mounted upon the sled and provided with vertical guide slots disposed longitudinally and transversely of the sled; a pair of shoulders secured to the standard and arranged on opposite sides of the longitudinal opening therein, said shoulders having a series of alining openings; a plow frame pivotally connected with said sled, and comprising wings extending on opposite sides of said sled; a brace connecting said wings and working in said transverse guide slot; an actuating lever working in said longitudinal guide slot, and connected with said plow frame and brace for raising and lowering said plow frame, said lever having a longitudinal slot adapted to register with the openings in said shoulders, and means adapted to be passed through said lever slot and said openings, for retaining said lever in adjusted position.

5. A plow comprising a sled; a V-shaped plow frame pivotally connected with the front end of said sled and including wings disposed on opposite sides thereof, the apex of said frame being disposed in advance of said sled; a bar mounted upon the front end of said sled and having its ends connected with said wings; and an actuating lever connected with said bar and brace for bodily raising and lowering said plow frame.

6. A plow comprising a sled; a plow frame pivotally connected with the front end of said sled and including wings extending on opposite sides thereof; means for bodily raising and lowering said plow frame; and means for bodily shifting said plow frame to one side or the other.

7. A plow comprising a sled; a plow frame pivotally connected with the front end of said sled and including wings extending on opposite sides thereof; means for bodily raising and lowering said plow frame; means for retaining said plow frame in its vertically adjusted position; and means for bodily shifting said plow frame laterally when so adjusted.

8. A plow comprising a sled; a plow frame pivotally mounted upon the front end of said sled, and including wings extending on opposite sides thereof; and an actuating lever pivotally mounted upon said sled and connected with said frame for raising and lowering the same; said lever having an independently movable section for bodily shifting said plow frame to one side or the other.

9. A plow comprising a sled; a plow frame pivotally mounted upon the front end of said sled, and including wings extending on opposite sides thereof; a brace connecting said wings; and an actuating lever for raising and lowering said plow frame, said lever comprising a main section connected with said sled and said brace, and an independently movable section pivotally connected with said main section and with said wings, for bodily shifting said plow frame to one side or the other.

10. A plow comprising a sled; a standard mounted thereon and formed with a vertical guide slot; a plow frame pivotally mounted upon the front end of said sled, and including wings extending on opposite sides thereof; and an actuating lever pivotally mounted upon said sled for raising or lowering said plow frame, said lever working in said guide slot, and having an independently movable section for bodily shifting said plow frame to one side or the other.

11. A plow comprising a sled; a standard mounted thereon, and provided with a vertical guide slot; a pair of shoulders secured to said standard and arranged on opposite sides of said guide slot; said shoulders having a plurality of alining openings; a plow frame pivotally mounted upon the front end of said sled, and including wings extending on opposite sides thereof; and actuating lever pivotally mounted upon said sled for raising or lowering said plow frame, said lever working through the guide slot in said standard, and having a longitudinal slot adapted to register with the openings in said shoulders; a pin adapted to be inserted through said openings and said slot; for retaining the plow frame in adjusted vertical position; and an independently movable section pivotally connected to the rear end of said adjusting lever and to said wings, for bodily shifting said plow frame to one side or the other.

12. A plow comprising a sled; a bar mounted on bearings in the front end of said sled; a plow frame pivotally mounted upon said bar and including wings extending upon opposite sides of said sled, each wing having a longitudinal slot formed therein, through which the adjacent bar end projects; and means for bodily shifting said plow frame to one side or the other of said sled.

13. A plow comprising a sled; a bar mounted on bearings in the front end of said sled; a plow frame pivotally mounted upon said bar and including wings extending upon opposite sides of said sled, each wing having a longitudinal slot formed therein, through which the adjacent bar end projects; and means connected with said bar and plow frame for raising and lowering the latter, said means having an independently movable section for bodily shifting said plow frame to one side or the other of said sled.

In testimony whereof, I affix my signature, in presence of two witnesses.

EDWARD W. MOODY.

Witnesses:
E. W. METTLER,
JAS. S. MARTIN.